US009936050B2

(12) United States Patent
Gerding et al.

(10) Patent No.: US 9,936,050 B2
(45) Date of Patent: Apr. 3, 2018

(54) METHOD AND COMMUNICATION SYSTEM FOR DATA COMMUNICATION

(71) Applicant: KROHNE Messtechnik GmbH, Duisburg (DE)

(72) Inventors: Michael Gerding, Bochum (DE); Markus Dabrowski, Duisburg (DE); Rene Keimling, Duisburg (DE); Christian Hansen, Hattingen (DE); Christoph Spiegel, Oberhausen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 210 days.

(21) Appl. No.: 14/682,166

(22) Filed: Apr. 9, 2015

(65) Prior Publication Data

US 2015/0296048 A1    Oct. 15, 2015

(30) Foreign Application Priority Data

Apr. 9, 2014  (DE) .................. 10 2014 105 075

(51) Int. Cl.
*G06F 15/16*   (2006.01)
*H04L 29/06*   (2006.01)
*H04L 29/08*   (2006.01)

(52) U.S. Cl.
CPC .............. *H04L 69/08* (2013.01); *H04L 67/12* (2013.01)

(58) Field of Classification Search
CPC ......... H04L 67/12; H04L 69/08; H04L 67/32; H04W 8/24
USPC .................................. 709/203–248
See application file for complete search history.

(56) References Cited

U.S. PATENT DOCUMENTS

| 7,020,532 | B2 * | 3/2006 | Johnson ............... | G05B 19/042 700/1 |
| 7,739,361 | B2 | 6/2010 | Thibault et al. | |
| 8,090,452 | B2 * | 1/2012 | Johnson ............... | G05B 19/042 700/17 |
| 8,452,883 | B2 * | 5/2013 | Dahl .................. | G05B 19/0423 709/230 |
| 8,484,285 | B2 * | 7/2013 | Bretin ................ | G05B 19/042 709/203 |
| 8,649,909 | B1 * | 2/2014 | Phillips ............... | G05D 7/0676 700/1 |
| 8,667,091 | B2 * | 3/2014 | Almadi ................ | H04L 41/069 709/219 |
| 9,031,702 | B2 * | 5/2015 | Pruchniewski ......... | H04L 47/70 700/275 |
| 9,489,832 | B2 * | 11/2016 | Nair ...................... | G08C 17/02 |

(Continued)

FOREIGN PATENT DOCUMENTS

DE         101 25 235 A1     1/2003
DE    10 2009 011 552 A1     9/2010

*Primary Examiner* — Moustafa M Meky
*Assistant Examiner* — Thorne E Waugh
(74) *Attorney, Agent, or Firm* — David S. Safran

(57) ABSTRACT

A communication arrangement, a gate device and method for data communication between a mobile operating unit and a field device provides a certain ease in handling. The method involves a user program being loaded onto or activated on the mobile operating unit. Furthermore, data from the mobile operating unit is transmitted to a data communication device and from the data communication device to a gate device and from the gate device to a transmitting device of the field device and/or is transmitted in the opposite direction.

6 Claims, 4 Drawing Sheets

(56) References Cited

U.S. PATENT DOCUMENTS

| | | | |
|---|---|---|---|
| 9,568,908 B2* | 2/2017 | Lawson | G05B 19/4185 |
| 2002/0120728 A1* | 8/2002 | Braatz | H04L 29/06 |
| | | | 709/223 |
| 2007/0283030 A1* | 12/2007 | Deininger | G05B 19/41865 |
| | | | 709/230 |
| 2010/0085002 A1 | 4/2010 | Knauff | |
| 2010/0293285 A1* | 11/2010 | Oishi | H04L 29/06 |
| | | | 709/230 |
| 2013/0171967 A1* | 7/2013 | Ashour | H04M 1/7253 |
| | | | 455/411 |
| 2013/0201316 A1* | 8/2013 | Binder | H04L 67/12 |
| | | | 348/77 |
| 2015/0081922 A1* | 3/2015 | Brett | H04W 8/245 |
| | | | 709/230 |

* cited by examiner

METHOD AND COMMUNICATION SYSTEM FOR DATA COMMUNICATION

BACKGROUND OF THE INVENTION

Field of the Invention

The invention relates to a method for data communication between at least one mobile operating unit and at least one field device. Furthermore, the invention relates to a communication arrangement for data communication between at least one mobile operating unit and at least one field device. Finally, the invention is related to a gate device having at least one input interface and at least one output interface.

Description of Related Art

In modern process automation, it is often typical to monitor processes or media, in that measurement variables are determined, in particular, using field devices in the form of measuring devices, or to monitor in respect to changes. Thus, it is known, for example, to determine the flow of a flowable medium through tubes or channels, in that, for example, measuring devices are used that operate according to the Coriolis or vortex method, in which ultrasonic signals are used or which determine the flow using calorimetry.

In order to determine the fill level of a medium, which can be a liquid or a bulk material, it is known from the prior art to evaluate the transit time of electromagnetic signals using the radar method, or more specifically using the TDR method. The Doppler Effect can also be applied, or plumb lines are used. Furthermore, there are many designs for recognizing certain fill levels, either capacitively, inductively or by using elements capable of swinging.

In order to obtain further information about the media or processes, measuring devices are also used, with which pH, temperature, viscosity, electric conductivity or electric resistance are measured.

On the other hand, field devices are used that allow for intervention in the corresponding process. Such field devices are called actuators or control elements. An example of such is valves that allow for the regulation of a medium being filled and/or drained. Furthermore, a field device can also be an element that affects the temperature, for example, in that it heats. Additionally, an actuator can be a stirring device.

In order to be able to optimally supervise, control and regulate complex processes, field devices are generally in contact with a control room (also called control station, switch room or measuring station), which are thus part of a process control system (PCS).

In the field of industrial application, so-called fieldbuses having corresponding protocols are often used for contact between field device and control room. Contact with cables or without cables, e.g., wireless, is known. Common fieldbuses or protocols are Ethernet, foundation fieldbus (FF), Profibus DP or PA, Modbus, etc.

Data from field devices is transmitted to the control room from the field devices or data, e.g., parameter values, or software components, etc., is received by the field devices from the control room.

This also means that many field devices do not allow direct access, but communicate only with the control room.

For this reason, many field devices have neither their own display device (also called display) nor an input device, e.g., in the form of a keypad or a minimal configuration of keys (e.g., arrow key+confirmation key).

However, many field devices have so-called human machine interfaces (often abbreviated to HMI, or also user interface) that allow a direct display of e.g., the measured value or also allow direct influence on the particular field device.

Some field devices have interfaces that allow e.g., the application of software or firmware even in field devices already installed in the process, or allow the access to deeper layers of the field device for specially trained staff. Such interfaces are sometimes so-called service interfaces.

In order to make working with the field devices possible or simpler for operating staff, it is also known to use so-called handhelds.

These mobile—i.e., mostly portable—hand devices allow, at least in part, immediate contact directly with a field device or they can be directly connected to the field device in order to influence the field device or, for example, to read data via this connection.

The parameterization of different field devices occurs, for example, by using special device description language (DDL) data files.

Since field devices from different producers, and even sometimes from the same producer, require different programs, access data, data processing possibilities, etc., it is possibly thus necessary to have to use different hand devices or for the hand devices to have correspondingly large libraries of control data or programs or other access data or programs.

In addition to the costs for hand devices, it is often a disadvantage that such devices are more complicated in operation or do not offer the ease that the operating staff is used to from their experiences as consumers, in particular in comparison to modern consumer electronics. An example of such is the rather intuitive handling as is common in modern, so-called smartphones.

It is common in so-called smartphones, to load so-called apps (abbreviation for application software), which allow special applications on the smartphone.

The simpler handling from the field of consumer (also user) electronics has not yet found access into the field of process automation or, more specifically, the interaction with individual field devices.

However, especially in the case of data communication between a mobile unit and a field device that is installed in a process system, it would be advantageous if at least the interaction with the mobile operating unit were as simple as possible. The reason for this is that the operation of such process systems is usually rather unpleasant for the operating staff (e.g., very high or very low temperatures, extreme humidity or air dryness, irritating noise levels, or unpleasant odors, etc.).

Furthermore, careful handling of the field device itself requires a high measure of concentration, so that the tools used (here, in particular, the mobile operating unit) should be as simple as possible.

If the operating staff is faced with a field device with the task of creating an at least generally temporary communication arrangement for data communication between the mobile operating unit and the field device, then, depending on the specific application, data is entered into the field device via the operating unit or data is received by the field device.

The data entered is, for example, a parameter for measurements by a measuring device as field device or for influencing the process using an actuator as field device. Further possibilities are calibration data or other correcting data. Alternatively or additionally, it is software or firmware that is installed in the field device.

On the other hand, there are applications, in which the mobile unit receives data from the field device. This is, for example, current measured values or history data. Furthermore, it can also be relevant to read data, with which the field device operates, such as, e.g., the version number of the software used, etc. Finally, depending on the specific application, access of a mobile operating unit to a field device allows for storage of data associated with previous access to the field device.

SUMMARY OF THE INVENTION

Thus, the object of the invention is to provide a method for data communication between a mobile operating unit and a field device and to provide a resulting communication arrangement that allows a certain ease in handling.

Mobile operating unit can be understood in the following as any type of portable or transportable unit that allows the input of data or information, a choice between alternatives, a display of data or sequences or another type of implementation of human machine communication—in particular with a field device, here.

The method according to the invention, in which the above described and derived object is met, is initially and essentially characterized in that at least one user program is loaded onto the mobile operating unit and/or at least one user program is activated on the mobile operating unit.

Such a user program is, for example, a so-called app that is either loaded for communication with the respective field device (e.g., in the form of a so-called download) or is present there—e.g., in a respective storage unit—and is activated for a specific use.

In one variation, the user program is loaded onto the operating unit at first contact with the field device, is actively used and, after ending communication with the field device, is available for future data communication in a deactivated state, out of which it can be reactivated.

In one design, the user program is characterized, in particular, in that it even allows for data communication with the field device.

In another design, the user program further allows the specific, special type of data exchange with the field device, so that e.g., the adjustable parameters dependent on the type of field device are displayed or are made available for selection or that a pleasant visualization suitable to the respective field device is used.

Overall, the user program establishes, or helps or supports data communication.

In particular, in conjunction with the user program, or for example, caused by it, data is transmitted from the mobile operating unit to a data communication device (and preferably also received there). Alternatively or additionally, data is transmitted from a data communication device to the mobile operating unit (and preferably received there).

Thus, overall, data is transmitted between the mobile operating unit and a data communication device, at least in one direction and preferably in both directions.

In particular for the bi-directional data transmission, preferably the mobile operating unit and the data communication device are designed and attuned to one another in such a manner that data communication is possible between both. Both have, in particular, corresponding interfaces that allow the sending and preferably also the receiving of data. For this, it is also advantageous when they both operate using the same type of data transmission and, in particular, the same data protocol.

In one design, wireless data transmission is carried out between the mobile operating unit and the data communication device. This additionally simplifies the initiation of and preparation for data communication. Data transmission is, for example, wireless, i.e., by sending and receiving electromagnetic radiation.

The data communication device, in one design, is used overall as a connecting point in respect to data communication for coupling the mobile operating unit to the peripherals of the field device for data communication.

Furthermore, data is transmitted between the data communication device and a gate device and, in particular, accordingly received. In one design, only one direction is provided for the communication of data. In a further design, bi-directional data transmission is also implemented, i.e., the data communication device and the gate device exchange data in both directions, are both sender and receiver in respect to one another.

The gate device is, in particular, in one design, provided for the conversion of data between different data protocols. This relates, in particular, to the data received via an input interface and according to one protocol, which is translated into another protocol and further transmitted via an output interface.

In a further design, the gate device is provided for monitoring and regulating data traffic. Data access can also be allowed or forbidden by it in this said design.

Finally, data is transmitted between the gate device and a transmitting device of the field device, i.e., output by one device and received by another device. Here, also, the data flow, in one design, goes only from one component to the other and in another design, data flow is bi-directional.

Thus, for data communication, after loading and activating or activating a user program that is already present, data is either transmitted in the following direction: from the mobile operating unit to the data communication device, from the data communication device to the gate device, and from the gate device to the transmitting device of the field device. Or the data is transmitted in the other direction: from the field device via the transmitting device to the gate device, and from the gate device via the data communication device to the mobile operating unit. Data can, depending on design and use, be transmitted in both directions. Furthermore, data is optionally transmitted between the components between the mobile operating unit and the field device additionally in the opposite direction, e.g., in the form a further inquiry about whether or not data was correctly received.

In one design, the transmitting device of the field device is a special interface for transmitting data in addition to a normal standard interface of the field device. A standard interface is, for example, 4-20 mA interface or another common interface in the field of process automation.

Alternatively or additionally, in one design, the transmitting device is also at least a part of such a standard interface or the transmitting device is a standard interface.

The transmitting device is, in one design, arranged within the field device and, in an additional design, is implemented using a component of the field device. The type of arrangement and the type of connection correspondingly affect the type of data communication or the corresponding protocol used.

The data transmitted between the above-described components between the mobile operating unit and the field device is, in one design, the same data—at least in content.

In a further design, it is at least partially different data, since, for example, changes are made to the data between the individual components or e.g., based on the received data, other data is transmitted depending on it, or more data is collected and further transferred as a bundle.

Overall, data is transmitted between the mobile operating unit and the data communication device, between the data communication device and the gate device, and between the gate device and the transmitting device of the field device. In at least one case, and preferably in all cases, data transmission takes place, thereby, in both directions, i.e., bi-directionally.

Data transmission thus allows for a transmission of data between the mobile operating unit and the field device initiated by, supported by or at least by means of the user program on the mobile operating unit.

Due to the design of the components—e.g., according to the following designs—it is possible to take into consideration the special demands and challenges of data communication in a process and with a field device installed there.

In one implementation of the method according to the invention, it is provided that a data protocol is used for data communication between the mobile operating unit and the data communication device. Thereby, the data protocol is fundamentally dependent upon whether the communication takes place, for example, via a cable or without a cable, e.g., is wireless. Furthermore, the data protocol is also dependent on the specific interfaces that are available to the components exchanging data with one another.

In the above design, a second protocol is used for the data communication between the transmitting device of the field device and the gate device. Thereby, the first data protocol and the second data protocol differ from one another.

Thus, in this design, two different data protocols are used between the mobile operating unit and the data communication device and between the transmitting device and the gate device.

In one design, the first and second data protocols differ at least in that the data transmission takes place using different media—i.e., using a cable or wireless.

In a further design, additionally or as an alternative to the above design, the data protocols differ principally in view of packaging or processing data.

For example, one data protocol relates to WLAN or Ethernet communication and another data protocol relates to Profibus PA communication or ZigBee communication.

In a further design, a data protocol results in that the components communicating with one another are attached together, so that data is communicated e.g., directly in digital or analog format, e.g., as a current or voltage signal.

In one design, a device from the field of consumer electronics is used as mobile operating unit. This is, for example, a laptop, a tablet or a smartphone. This also means that such operating units provide the user with the corresponding possibilities and advantages that are often common in the field of consumer electronics.

A device from the field of industry electronics is used as field device, which also fulfills the requirements there.

Thus for data communication in this design, one device from consumer electronics and one device from industry electronics are connected to one another, or access to the field device from industry electronics is implemented using an operating unit from the field of consumer electronics.

This connection of devices from different worlds of application, and technological or electronics fields is made possible using the components connected between them— data communication device, gate device, and transmitting device. Conversely, these components also allow for the regulation or channeling of data transmission between the devices that often have different safety standards.

One advantage in the use of a mobile operating unit from the field of consumer electronics is that the operating staff can use knowledge and experience gained from everyday dealings.

In one design, in particular, the mobile operating unit is used from the field of consumer electronics with operating systems and programs common there. Linux, Unix, Windows, Android or Mac OS or counterparts for smartphones are possible operating systems here.

In one design, for example, the user program allows that data received by the mobile operating unit from the field device can be shown and/or can be processed with the programs known from the field of consumer electronics. This applies, for example, to text, spreadsheet or graphics programs.

One design provides for the first data protocol to be taken from the field of application of consumer electronics and for the second data protocol to be taken from the field of application of industry electronics.

The first data protocol relates to WLAN, Ethernet or http communications. The second data protocol is carried out using e.g., Modbus standard, Profibus PA, Fieldbus Foundation, etc.

According to a further teaching, the above object is met by a communication arrangement that is characterized at least in that at least one user program can be loaded onto the mobile operating unit and/or at least one user program can be activated on the mobile operating unit, that at least one data communication device is provided for transmitting data to the mobile operating unit and/or for receiving data from the mobile operating unit, that at least one gate device is provided for transmitting data to the data communication device and/or for receiving data from the data communication device, and that the field device has at least one transmitting device for transmitting data to the gate device and/or for receiving data from the gate device.

A communication arrangement is to be understood as an arrangement that exists at least for a certain amount of time, when a mobile operating unit is to access a field device, i.e., data transfer occurs.

A communication arrangement results, in particular, in the immediate surrounding area of the field device, so that, for example, so-called near-field data protocols can be used, or so that the mobile operating unit can be directly connected to the field device using a cable.

In a further design, the communication device ensues over greater distances, in that, for example, further components or e.g., so-called routers are used for data transmission.

In one design, a so-called ad-hoc net is formed, which forms the communication arrangement and thus also allows for greater distances between the mobile operating device and the field device.

Furthermore, several field devices can be contained in the communication arrangement or, alternatively or additionally, several mobile operating units are involved in one communication arrangement.

The communication arrangement according to the invention is comprised of at least one mobile operating unit, a data communication device, a gate device and a transmitting device of the field device. Data is transmitted at least in one direction and preferably also in both directions via these components. Overall, however, it is implemented that data from the mobile operating unit reaches the field device or data reaches the field device from the mobile operating unit.

The term data is widely understood, for example, it is measuring or controlling data, parameter values, identification data, software or firmware, etc.

The data communication device, the gate device and the transmitting device are, depending on the specific application, grouped into common devices or are different functionalities of one unit.

In one design, in particular, the transmitting device is a type of interface of the field device and thus is directly a part of the field device.

In a further design, for example, the field device includes the data communication device, the gate device and the transmitting device, wherein, in one design, this is implemented, at least in part, using components that can be reversibly separated from one another.

In one design, the data communication device and the gate device form one common device, which, on the one hand, communicates with the mobile operating unit and, on the other hand, communicates with the field device via the transmitting device.

In an additional design, components of a second field device are functionally involved in the communication arrangement, in which the mobile operating unit communicates data with the first and actual field device.

Thus, in one design, the gate device belongs to an additional and alternatively integrated field device, which allows for communication between the mobile operating unit and the actual field device using its gate device.

In another design, the mobile operating unit has command of the data communication device and/or the gate device.

In one design, the data communication device and/or the gate device are integral components of the mobile operating unit.

In an alternative design, the data communication device and/or the gate device can be temporarily connected to the mobile operating unit. In the latter design, for example, a mobile operating unit becomes a mobile and preferably portable device due to coupling with the data communication device and/or gate device, and, depending on the design, it can come directly into contact with a transmitting device of the field device.

Data is transmitted via the above-mentioned components at least in one direction and preferably in both directions. Overall, however, it is implemented that data reaches the field device from the mobile operating unit or the mobile operating unit from the field device.

For data communication, on the one hand, different media (for example, using a cable or wireless, or via a voltage or current signal, or via electromagnetic signals in any frequency range) can be used. On the other hand, different types of data processing or data switching can be used. The latter relates to so-called protocols.

Thus, one design provides that the mobile operating unit and the data communication device use a first data protocol for data communication and that the transmitting device of the field device and the gate device use a second data protocol for data communication, wherein the first data protocol and the second data protocol are different from one another.

In one design, the first and second data protocols differ from one another in that they apply to different transmitting media (e.g., cable and wireless).

In a further design, which is independent of type and character of the used components or devices or units, it is additionally or alternatively provided that the first data protocol comes from the field of consumer electronics and that the second data protocol comes from the field of industry electronics.

Different protocols are used in the field of industrial applications and in the field of user or consumer electronics, each relating to the particular requirements or prevailing standards. In general, it is not typical, thereby, to use a protocol in another field. This is due, in part, to the different available resources, to the speed required for data transfer, or to the safety criteria to be met.

In the above-mentioned design, the mobile operating unit communicates with the data communication device using a data protocol from consumer electronics and the transmitting device of the field device and the gate device exchange data at least in one direction or in both directions using a data protocol from industry electronics.

The data protocol of industry electronics is, in one design, especially a data protocol from the field of process automation.

Since the data protocols come from different fields of electronics, in particular, an exchange or translation between the protocols in the area between the data communication device and the transmitting device takes place in this design, i.e., in particular in the data communication device and/or the gate device.

In one design, the gate device is used for the actual exchange between the two protocols or for guaranteeing the respective general conditions and possibly also safety conditions.

The concept of using different electronics fields is pursued or taken up, in one design, in that it is provided that the mobile operating unit is a device from the field of consumer electronics and that a device from the field of industry electronics is used as field device.

In the field of consumer electronics, for example, tablets, smartphones, handheld computers, or laptops are common. These are characterized at least by a high performance capacity and high ease of use.

However, it can be disadvantageous—in particular in view of industrial use—that not necessarily all protection classes are fulfilled, such as the compliance of explosion prevention. The reason for this is that the requirements for industrial applications and user applications differ from one another.

Thus, it is provided in one design that the mobile operating unit is used for special applications in a protection unit that ensures the compliance of prevailing safety conditions in the area of the field device and further allows or limits, as little as possible, the operation of the mobile operating unit.

On the other hand, the field device comes from the field of industry electronics, thus, is, for example, native to the field of process automation.

The field device is, thereby, either a measuring device, so that preferably also at least one sensor unit is provided, or the field device is a so-called regulating unit, which can be used to influence a process or a medium.

In a further design, the field device is both a sensor as well as an actuator.

According to a further teaching, the invention further relates to a gate device that at least supports and/or allows data communication between a mobile operating unit and a field device.

The gate device thereby has at least one input interface and at least one output interface. Thereby, the gate device communicates—i.e., sends or receives—data via the input interface using a data protocol and via the output interface using a different data protocol. For this, the interfaces are correspondingly designed to send or receive data according to the respective protocol.

In one design, the output interface also functions as input interface, and in a further design, the input interface is also an output interface.

Overall, in an additional design, the gate device has two in/output interfaces, wherein a first in/output interface communicates, i.e., sends or receives data with the data protocol and the second in/output interface communicates data with another data protocol.

The gate device is designed such that it receives data according to a data protocol and transmits data according to another data protocol.

In one design, the data is, essentially in terms of content, the same data that is sent or received in another format. Thus, the gate device is also used for translation from one protocol to the other protocol.

Furthermore, the gate device is used, in one design, for adjusting to the different requirements that are associated with the individual protocols in the field of data transmission.

In one design, the gate device controls the data communication between the two sides, to which the input or output interfaces belong or are assigned. In this manner, in one design, for example, the gate device blocks the transmission of data to the field device when authorization has not been given.

In an additional design, the input and output interfaces are exchanged with one another in respect to their data protocols.

One design relates to the data protocols and specifies them more exactly.

In this manner, it is provided in this design that the data protocol comes from the field of application of consumer electronics and that the other data protocol is typical in the field of application of industry electronics.

Thus, it is provided in this design that the data protocols come from fields of application that clearly differ from one another in terms of goals and performance, but also in terms of safety guidelines.

The gate device thereby fulfills the purpose of mediating between the protocols of consumer and industry electronics and for ensuring a clean and reliable data transmission.

Thus, the gate device is actually also a type of gate that allows or refuses the transition between different areas or even worlds.

In one design, the gate device allows for sending and receiving via a plurality of different data protocols.

In another design, the gate device is firmly fixed to the two data protocols (i.e., first and second data protocol).

Furthermore, the gate device is, in one design, assigned to one specific field device and/or one specific mobile operating unit, so that communication with other field devices and/or other mobile operating units is principally not possible.

In an additional design, the gate device is to be separately activated or enabled using a type of code for data communication.

It is provided in one design that the other data protocol, with which the gate device communicates using the output interface, is the above-described second data protocol for data transmission between the gate device and the transmitting device of the field device.

It is provided in one design that the gate device can be connected to the input interface with a data communication device and to the output interface with a transmitting device of a field device.

Overall, the gate device is an intermediary component for the transition from the side of the mobile operating unit to the side of the field device.

The designations input interface and output interface are, thereby, in one design, related to a moment of data transmission. Thus, if data is transmitted in the opposite direction in a following moment, the designations are correspondingly exchanged.

Finally, the invention relates to a user program that can be run on the mobile operating unit and is, thereby, active in the scope of data communication between the mobile operating unit and a field device.

The user program is, in one design, in particular an app that, for example, can be loaded from a corresponding library provided, for example, by the field device or stored in data storage of the mobile operating unit.

The above design, implementations and explanations in respect to the method or the communication arrangement or the gate device or also the user program are correspondingly valid for one another.

In detail, there is a plurality of possibilities for designing and further developing the method according to the invention, the arrangement according to the invention or also the gate device according to the invention. Reference is made to the following description of embodiments in conjunction with the accompanying drawings.

DETAILED DESCRIPTION OF THE INVENTION

Figure 1:
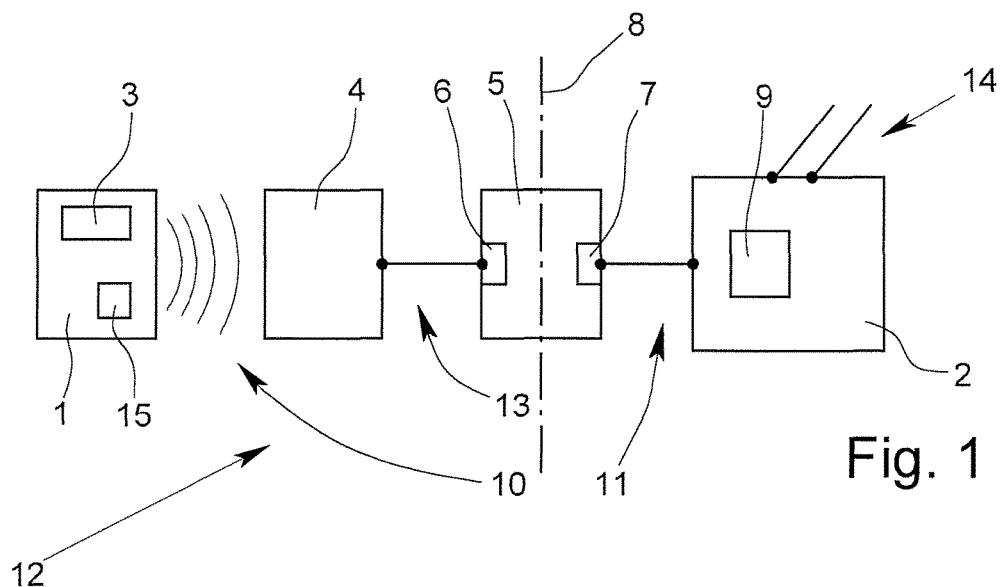
FIG. 1 is a schematic representation of a communication arrangement as block diagram.

An example of how a mobile operating unit 1 communicates with a field device 2 of process automation is shown in FIG. 1.

For this, a user program 3 is loaded onto the mobile unit 1 in a first step. This user program 3, which is present in the form of an app, is used, in particular, for the communication between the mobile operating unit 1 and the field device 2.

If, for example, the user program 3 has been started by the operating staff, data communication then begins—In the illustrated embodiment and for the present moment—between the mobile operating unit 1 and a data communication device 4.

Alternatively—and not shown here—it is provided that the user program independently recognizes that the field device is located in the proximity, e.g., via a corresponding sensor as part of the mobile operating unit, and, using this knowledge, that the user program automatically begins data communication or at least the basic initiation of such communication.

In the case shown here, the mobile operating unit 1 sends data to the data communication device 4, wherein a wireless connection is generated, e.g., using electromagnetic signals.

Here, the data communication device 4 is used as a receiver for the signals or data of the mobile operating unit 1 and transmits this data to the gate device 5. The data is, in particular, transmitted from the data communication device 4 to the input interface 6 of the gate device 5.

Hereby, data is transmitted via a wire between the data communication device 4 and the input interface 6.

The gate device 5 processes the data and issues it to the transmitting device 9 of the field device 2 via the output interface 7.

A sort of border 8 that separates the area of the components from one another runs between the input interface 6 and the output interface 7.

Thus, components, which come from consumer electronics or are designed for use with consumer electronics, are located on the side of the border 8 where the mobile operating device 1 is.

Components used in the field of industry electronics and, in particular, process automation are located on the other side of the border 8 with the field device 2.

The components on both sides differ in view of their possibilities, requirements profiles, capacity, but also reliability or safety classes.

Moreover, in general, different data protocols for transmitting data are used. Thus, for example, 4-20 mA signals are seldom used for data communication between computers.

The gate device 5 is located between the two sides or types of electronic devices and constitutes a transmitting function or also and adapting function between the two sides.

Data is transmitted from the gate device 5 via the output interface 7—also a wire here—to the transmitting device 9 of the field device 2. The transmitting device 9 is, thereby, a sort of interface, in the embodiment shown here, for issuing and also, here, for receiving signals.

In the illustrated embodiment, the transmitting device 9 is additionally a part of the field device 2 itself.

Overall, data is transmitted from the mobile operating unit 1 to the data communication device 4, from there to the gate device 5 and from there, finally, to the transmitting device 9 and, thus, In the illustrated embodiment, in the end to the field device 2 itself.

The paths of data between the components—mobile operating unit 1, data communication device 4, gate device 5, transmitting device 9 and field device 2—are described here in only one direction. Data is, however, preferably transferred bi-directionally. This means, for example, that the gate device 5 has two in/output interfaces 6, 7.

Corresponding data protocols are further used for the communication of data.

In respect to the border 8 and the electronic components on both sides associated with it, it is provided that a first data protocol 10 is used between the mobile operating unit 1 and the data communication device 4 and a second data protocol 11 is used between the gate device 5 and the transmitting device 9.

The two data protocols 10, 11 thereby differ from one another, and namely not only in respect to one another, in that wireless communication (first data protocol 10) and communication using a cable (second data protocol 11) are used.

The two data protocols 10, 11 further differ from one another in that they are standard in the application for the type of electronic components located on their side in relation to the border 8.

In this manner, the first data protocol 10 is typical for the application of consumer electronics, e.g., Bluetooth or WLAN. The second protocol 11, however, is typical for industry electronics and, here, for example, is typical for HART signals or 4-20 mA signals.

Overall, the mobile operating unit 1, the data communication device 4, the gate device 5, the transmitting device 9 and the field device 2 form a communication arrangement 12, through which, in particular, a border 8 runs here, which relates to the device and application areas, from which the components are taken.

An advantage is, in particular, employed in that the mobile operating unit 1 comes from the field of consumer electronics and that, thus, a greater range of available devices as end devices are available for users or operating staff. Additionally, there is the advantage that it is possible to use programs that the user is acquainted and familiar with from normal use that is not associated with industry or process automation.

The gate device 5 communicates with the data communication device 4 via the input interface 6 and additionally via a data protocol 13 that is also borrowed from the field of application of consumer electronics and that is also different from the second data protocol 11 for that reason.

In the illustrated embodiment, the data protocol 13 and the first data protocol 10 additionally differ from one another, wherein—disregarding wireless or cable transmission—another coding of the data is provided.

The field device 2 also has—in addition to the transmitting device 9 designed as interface—a standard interface 14, The standard interface 14 thereby relates to one of the standards that is typical in the field of field devices or process automation or industry electronics.

Here, in particular, this is a so-called two-wire interface, which allows data transmission in the form of current.

The mobile operating unit 1 is provided with a storage unit 15, in which data issued by the field device 2 can be stored, depending on the specific application.

In another embodiment, different user programs 3 are stored in the storage unit 15 that are activated accordingly for different field devices 2.

In another application, data that is intended for transmission to the field device 2 is provided in the form of parameters or software in the storage unit 15.

In one embodiment, the storage unit 15 includes calibration data that is input into the field device 2, so that the field device 2 e.g., can process measuring data insofar as that the determined values can be directly transmitted to a control room without further processing of the value or particular reprocessing being necessary.

Figure 2:
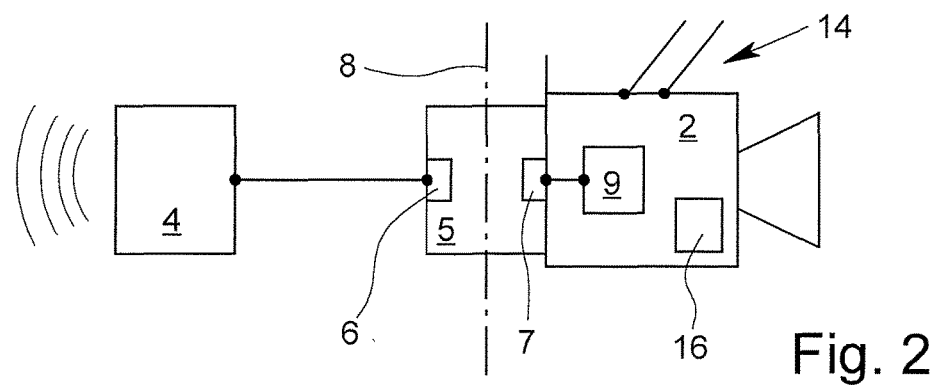
FIG. 2 is a schematic representation of components of a communication arrangement according to an alternative design.

A field device 2 is shown in FIG. 2 that is a measuring device for determining distance or fill level. An antenna is provided for this.

The field device 2 has data storage 16, in which current and old measuring data is stored as so-called history data.

The transmitting device 9 and the gate device 5 directly associated with it are located in the field device 2. This means that the border 8 between the field of consumer electronics and the field of industry electronics also runs through the field device 2 itself.

The field device 2 shown thus receives data with a data protocol that is typical in the field of application of consumer electronics (e.g., WLAN, Ethernet, Bluetooth) via the input interface 6 of the gate device and thus, at the same time, also via the input interface 6 of the field device 2.

The connection between the transmitting device 9 and the output interface 7 of the gate device 5 is implemented with direct contact.

In addition to the output interface 6 that allows communication with a data protocol of consumer electronics, the field device 2 also has a standard interface 14 from the field of industry electronics or, more specifically, process automation.

Thus, the field device 2 is provided with two different interfaces 6, 14 for issuing and, in particular, also for receiving data.

A connection via an electric wire to the data communication device 4 from the input interface 6 is present, which allows bi-directional data transmission here, and via which data is transmitted in the form of a data protocol of consumer electronics.

The data communication device 4 communicates wirelessly with the mobile operating unit—not shown here.

Figure 3:
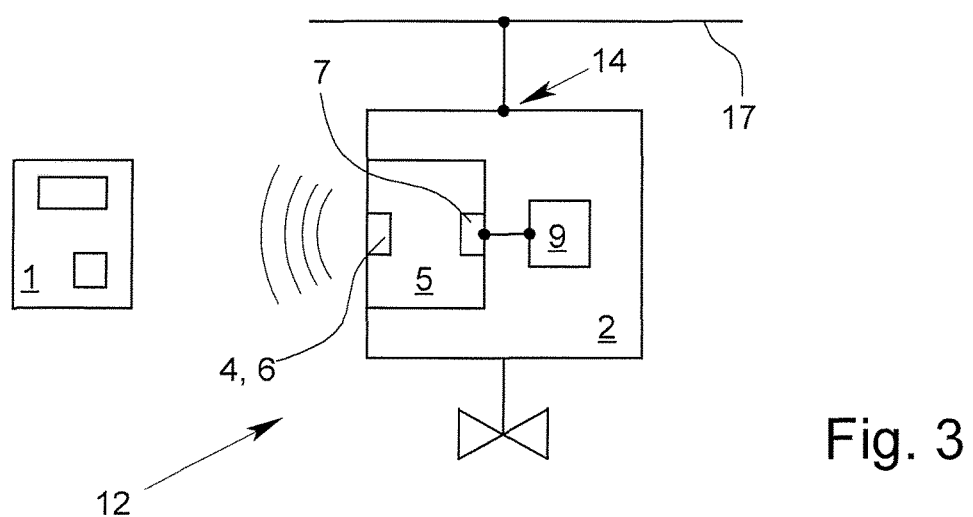
FIG. 3 is a schematic representation of a further embodiment of a communication arrangement.

The field device 2 of FIG. 3 is directly connected to a fieldbus 17 via the standard interface 14 and directly communicates with a control room—not shown here.

The field device 2 includes the transmitting device 9, which is implemented and carried out by a component of the field device 2.

This is, for example, a microprocessor that receives data from the gate device 5 also integrated in the field device 2 or that transmits data via the respective interface 7 of the gate device 5.

In the illustrated embodiment, the input interface 6 and the output interface 7 of the gate device 5 allow for data transmission preferably in both directions and are thus also in/output interfaces.

In the illustrated embodiment, particular, the output interface 7 is an electric contact via which contact exists between the gate device 5 and the transmitting device 9.

The input interface 6 and the data communication device 4 concur into one component, so that the gate device 5 uses the data communication device 4 as an interface 6.

The components for data transmission and for implementing the communication arrangement 12—data communication device 4, gate device 5 and transmitting device 9—are compactly accommodated here and only internal communication takes place between the components.

The field device 2 is designed as a regulating unit here—e.g., specifically as a valve—and allows communication via a protocol of consumer electronics with a mobile operating unit 1.

Figure 4:
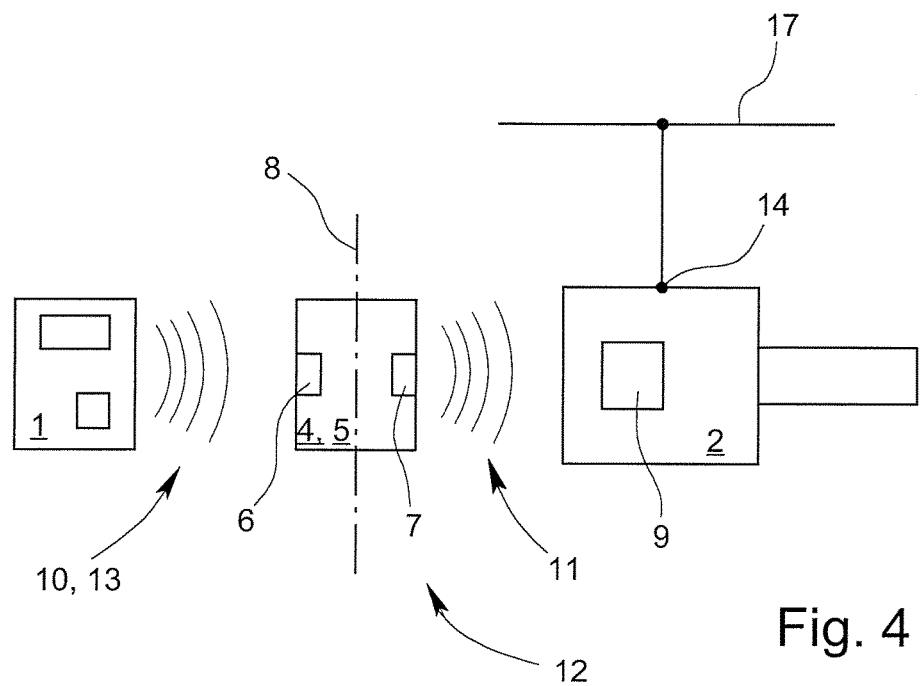
FIG. 4 is a schematic representation of a further variation of the embodiment of a communication arrangement.

The field device 2 is designed as a measuring device in FIG. 4 and is used for analyzing media—not shown here—e.g., by determining the pH value. The already completely processed measuring data is thereby transmitted directly to a control room—not shown here—via the standard interface 14 and the fieldbus 17.

In the shown communication arrangement 12, the data communication device 4 and the gate unit 5 form a unit, through which the border 8 between consumer electronics (in particular the mobile operating unit 1) and industry electronics (in particular the field device 2) also runs.

Thereby, the input interface 6 of the gate device 5 is, overall, also the interface of the unit comprised of data communication device 4 and gate device 5, to which data is transmitted by the mobile operating unit 1 (here indicated by waves) or from which data is preferably received by the mobile operating unit 1.

The output interface 7 is provided on the other side, via which data is transmitted to the transmitting device 9 from the gate device 5 or via which the gate device 5 receives data in the opposite direction from the transmitting device 9 and thus from the field device 2.

In the design shown, the first data protocol 10 and the second data protocol 11 each relate to a wireless data transmission.

Thereby, the data protocol 13, with which the gate device 5 transmits or receives data via the input interface 6, concurs with the first data protocol 10. At the same time, the other data protocol for issuing data via the output interface 7 is the same as the second data protocol 11.

In the illustrated embodiment, the entire arrangement is, thus significantly simplified due to the reduction of the number of components involved.

Due to the partially symmetrical arrangement, it also becomes clear that the gate device 5 is used for the separation between the two areas and thus also the conversion of data between the different protocols.

Figure 5:
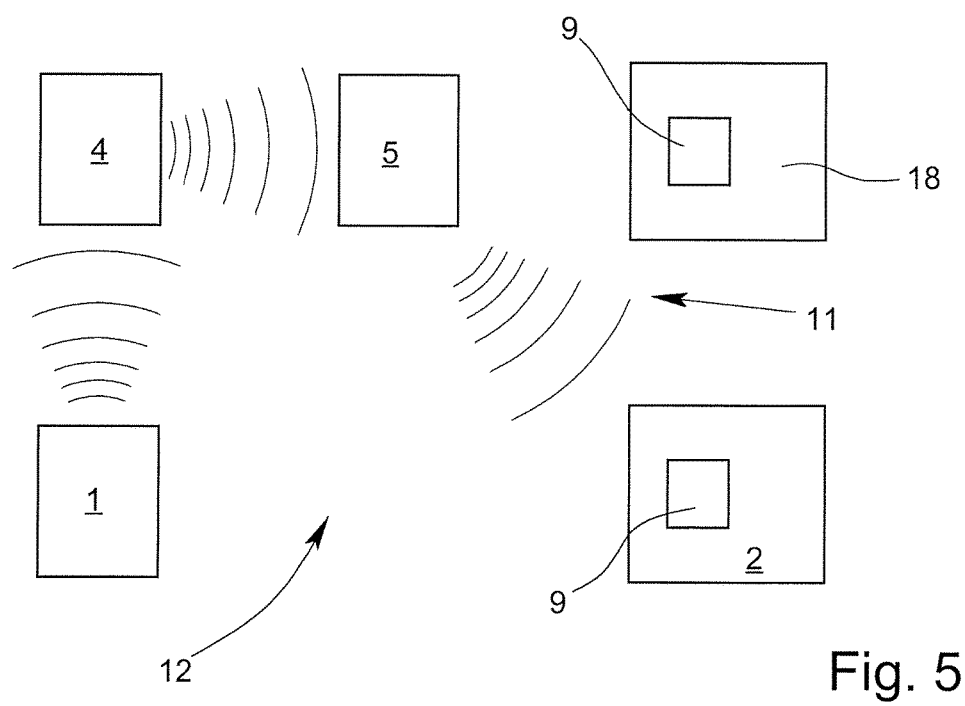
FIG. 5 is a schematic representation of another design of a communication arrangement.

A communication arrangement 12 is shown in FIG. 5, in which, in addition to the field device 2, a further field device 18 is present.

A data communication device 4 and a gate device 5 are assigned to this further field device 18, so that communication can take place with the transmitting device 9 of the further field device 18—as is shown in FIG. 1.

In the case shown in FIG. 5, however, data communication should be implemented between the mobile operating unit 1 and the actual field device 2.

Therefore, the communication arrangement 12 is created via the data communication device 4 and the gate device 5 of the further field device 18.

The course of data via this communication arrangement 12, which, as it were, takes a detour since there is not a direct path, is illustrated in FIG. 5 through the wave signals.

The mobile operating unit 1 thus sends data via the data communication device 4 and the gate device 5, which are assigned to the further field device 18.

However, then, the data from the gate device 5 is not sent to the transmitting device 9 of the further field device 18, but instead to the transmitting device 9 of the field device 2, in the proximity of which the mobile operating unit 1 is located, wherein the second data protocol 11 is used.

In one design, in order to guarantee the orientation of signal transmission, the mobile operating unit 1 encodes the data to be transmitted with a code for the field device 2, for which the data is intended.

Thus, the gate device 5 sends the data so that it can be determined only by the chosen field device 2, in that an encryption is used.

In a further design, different frequency ranges are used for the individual field devices 2, 18.

Such bypassing, in which components from other field devices 18 are used, allows, depending on the specific application, for communication arrangements over greater distances or also allows, in the case that components for data communication of a field device are defect, for a communication arrangement to still be created.

The integration of further components, such as, for example, routers for transmitting data—not shown here—is also possible.

Such redirection can also be helpful in situations in which, for example, the field device to be contacted is located outside of the range of the operating staff or at locations that are difficult to access.

Figure 6:
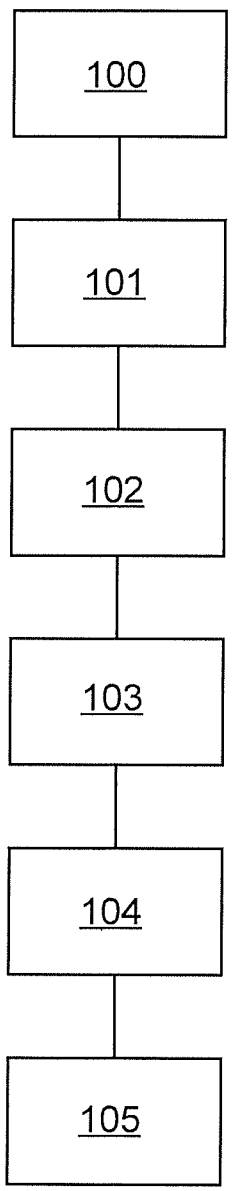
FIG. 6 is a first flowchart for the initiation of data communication.

A flowchart for the organization of data communication between a mobile operating unit and a field device is shown in FIG. 6, wherein, here in particular, a variation should be described in which the mobile operating unit receives the user program—i.e., for example the app—for data communication.

In the first step 100, the mobile operating unit is brought into the proximity of the relevant field device. The mobile operating unit has a rudimentary form of a user program, in order to be able to at least make first, basic contact with the field device.

In step 101, the mobile operating unit sends a request to the field device via the data communication device, the gate device, and the transmitting device.

In one embodiment, the request is implemented using RFID technology and namely, in such a way that the field device recognizes a RFID transponder of the mobile operating unit in its proximity and interprets this as a request.

This request is reviewed by the gate device in one embodiment and by the field device in another embodiment in step 102.

For example, it is determined if the mobile operating unit is authorized for data communication or if data is allowed to be exchanged at all with this operating unit.

It is also provided in one variation that an access code is transmitted to the field device with the request, which ensures that only the authorized person has access to the field device.

In step 103, the field device transmits—after a successful review—the necessary user program for actual data communication between the mobile operating device and the field device.

In one embodiment, it is provided in step 103 that the field device supplies the mobile operating device with energy, which is, for example, collected in a power pack by the mobile operating device.

In another embodiment, the mobile operating unit replies to the receipt of the user program, in that the operating unit supplies the field device with an amount of energy that compensates for the increased energy demand for subsequent data communication.

In step 104, the user starts the app on the mobile operating unit.

In step 105, data communication then takes place, which, depending on the specific application, consists of reading data from the field device into the mobile operating unit or of inputting parameters into the field device.

Figure 7:
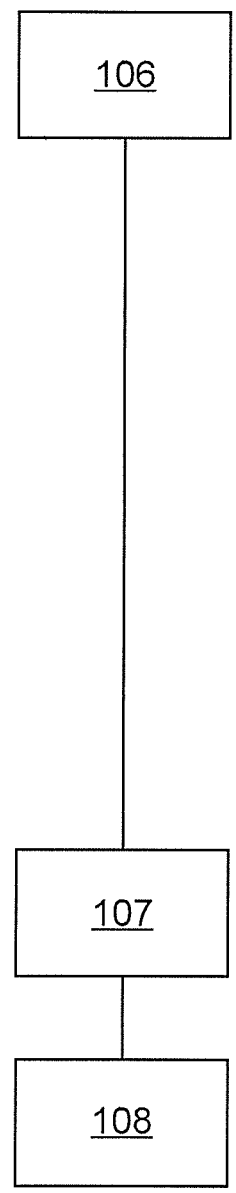
FIG. 7 is a second flowchart for an alternative variation for initiating data communication.

In the further embodiment according to FIG. 7, the mobile operating unit has a library of user programs.

Thus, in the first step 106, the mobile operating unit is also brought into the proximity of the field device or is at least oriented for communication with a special field device.

Since the user program is already present on the mobile operating unit, the user can immediately start the user program in step 107, so that data communication can follow in step 108.

In an additional embodiment—not shown here—, the mobile operating unit obtains the user program via a link, which allows the download using an Internet connection.

For this, the field device shows the corresponding Internet address or the required download parameter on a display after the first contact and after suitable identification of the mobile operating unit or operating staff.

Such an Internet connection, which is typical in many mobile operating units of consumer electronics, is a further great advantage that results from linking such an operating unit for data communication—e.g., tablet or smartphone—with a field device.

The user program—the app—is, for example, used thereby for data communication, provides for the conversion of data, implements suitable access to the respective field device and/or allows for the appropriate presentation of values or parameters, etc. for the field device.

In a further embodiment, the user program also provides a special user interface. Additionally or alternatively, the data received by the field device or to be sent to it is processed for easier operability, or communication is designed to be simpler and more manageable for the operating staff.

The user program, in one embodiment, also supports data communication with a touchscreen.

Figure 8:
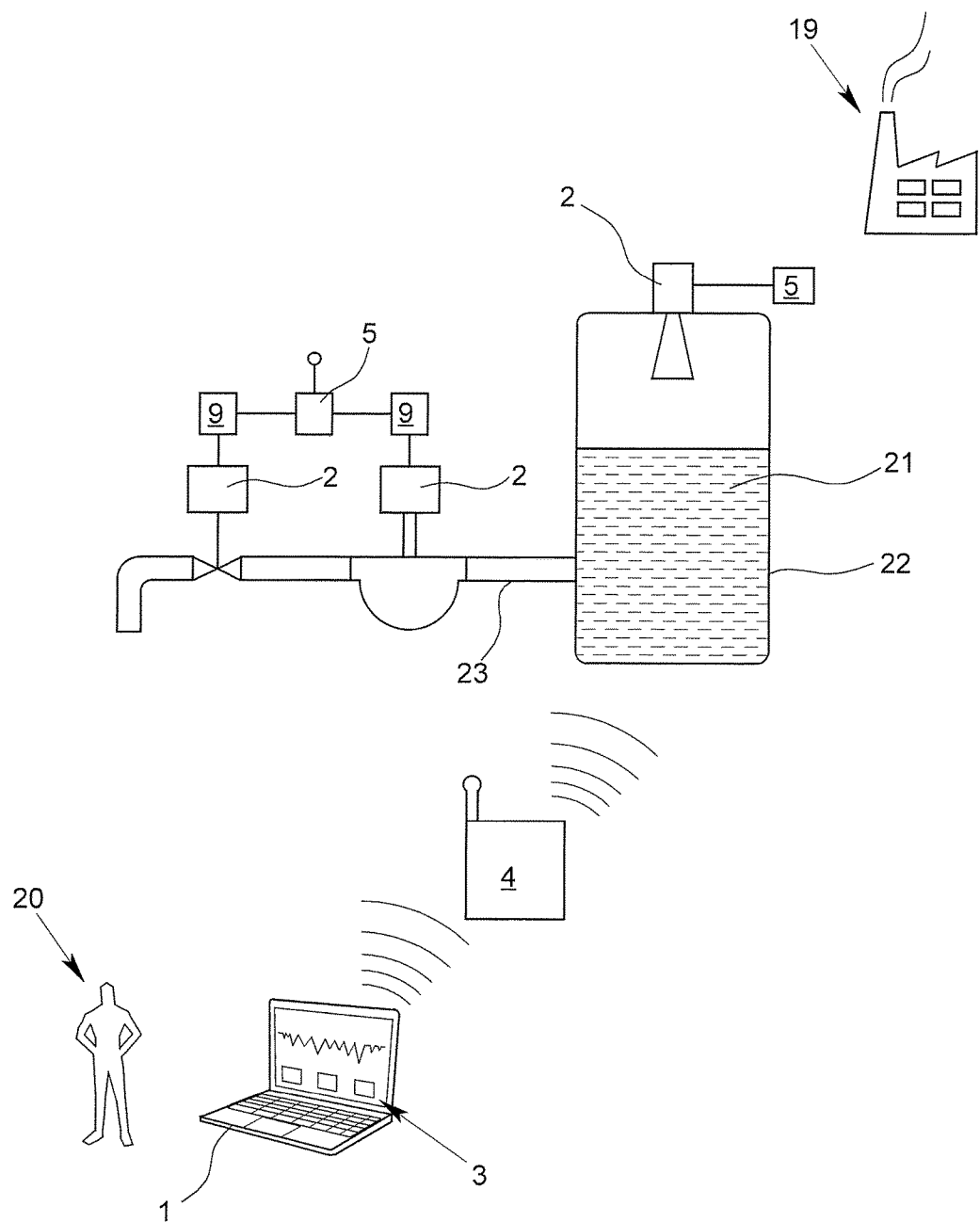
FIG. 8 is a very schematic representation of a specific application for data communication within a process system.

A process system 19 is indicated in FIG. 8, in which an operator 20 is found with a mobile operating unit 1 in the form of a laptop.

This operator 20 communicates, here, using three user programs 3 with three different field devices 2 that monitor the fill level of a medium 21 in a container 22, that determine the flow of the medium 21 through a tube 23, and, finally, that control the draining of the medium out of the tube 23 with a valve.

The user programs thereby result from one basic program in conjunction with field device-specific data stored in a database, which each add up to device descriptor profiles.

Typical programs from the field of consumer electronics or programming tools or languages are used to link the data, or the generation of user programs, or the interaction of the basic program to the database. In this respect, the mobile operating unit 1 thus functions like a normal laptop or PC, etc.

The user programs allow for the transmission of data from the mobile operating unit 1 to the data communication device 4, which transmits the data further to the gate device 5—wirelessly here.

The field device 2 attached to the container 22 thereby has its own gate device 5.

The two devices 2 in contact with the tube 23 have a common gate device 5. This makes is necessary for the data to be encoded in respect to the receiving field device 2.

In the opposite direction, preferably also the data coming from the field devices 2 is clearly identified in respect to its origin.

The common gate device 5, here, is connected to the two transmitting devices 9 located outside of the field devices 2.

Data flow only from the mobile operating unit 1 to the field devices 2 is shown. Preferably, however, data from the field devices is transmitted to the mobile operating unit 1.

The shown or described embodiments of the used components, or the respective communication arrangement, or also the different courses of data communication can also correspondingly be combined with one another and can complement one another.

What is claimed is:

1. A method for data communication between at least one mobile operating unit and at least one field device, comprising the steps of:
    at least one of loading at least one user program onto the mobile operating unit and activating at least one user program on the mobile operating unit, at least one of transmitting data from the mobile operating unit to a data communication device and transmitting data from the data communication device to the mobile operating unit, at least one of transmitting data from the data communication device to a gate device and transmitting data from the gate device to the data communication device, and at least one of transmitting data from the gate device to a transmitting device of the at least one field device and transmitting data from the transmitting device of the at least one field device to the gate device, wherein the data is encoded by the mobile operation unit with a code determinable by only a field device for which the data is intended, the encoded data being transmitted by the gate device to the field device for which the data is intended.

2. The method according to claim 1, wherein a first data protocol is used for the data communication between the mobile operating unit and the data communication device, and wherein a second data protocol is used for the data communication between the transmitting device of the field device and the gate device, and wherein the first data protocol and the second data protocol differ from one another.

3. The method according to claim 2, wherein the mobile operating unit is a consumer-specific device and the field device is an industry-specific device.

4. The method according to claim 3, wherein the device from the field of consumer electronics is at least one of a laptop, a tablet and a smartphone and wherein the device from the field of industry electronics is at least one of a measuring device, a control device and an actuator device.

5. The method according to claim 4, wherein the first data protocol and the second protocol are different types of protocols.

6. The method according to claim 5, wherein the first data protocol is at least one of WLAN, Ethernet, Hypertext Transfer Protocol (http) and low-power wireless connectivity technology protocols, and wherein the second protocol is at least one of foundation fieldbus (FF), Profibus DP or PA, serial communication protocol and IEEE 802.15.4-based high-level communication protocols.

* * * * *